March 24, 1959  D. C. FOX  2,879,019
CHRISTMAS TREE STAND
Filed May 17, 1956
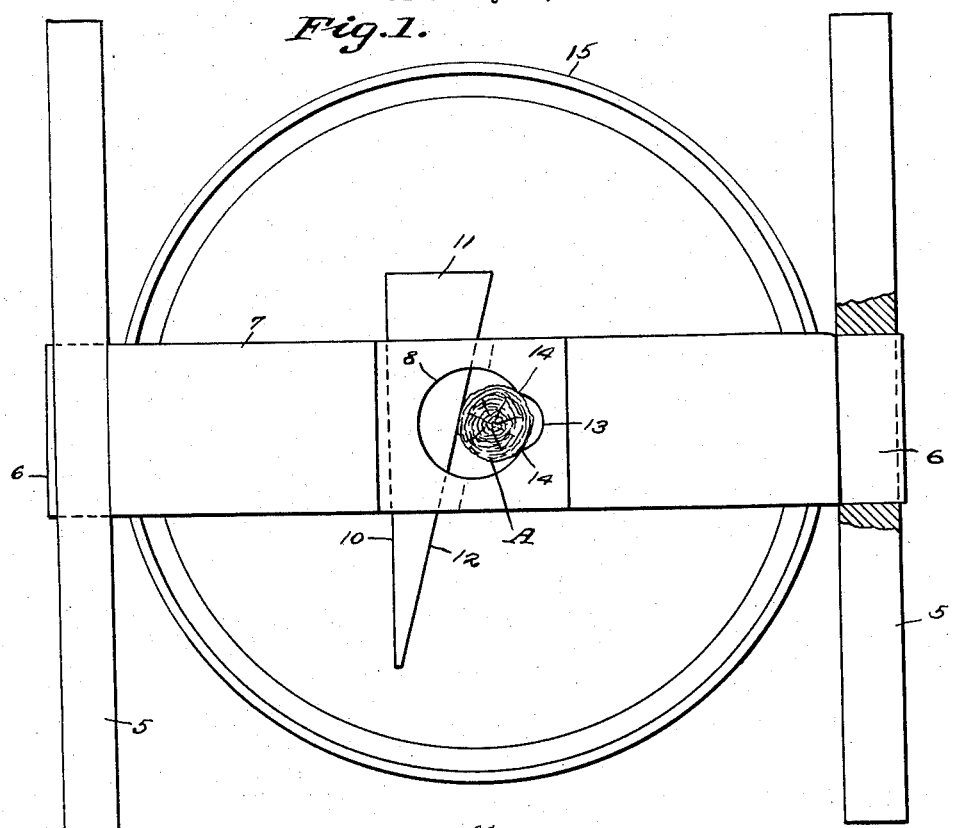
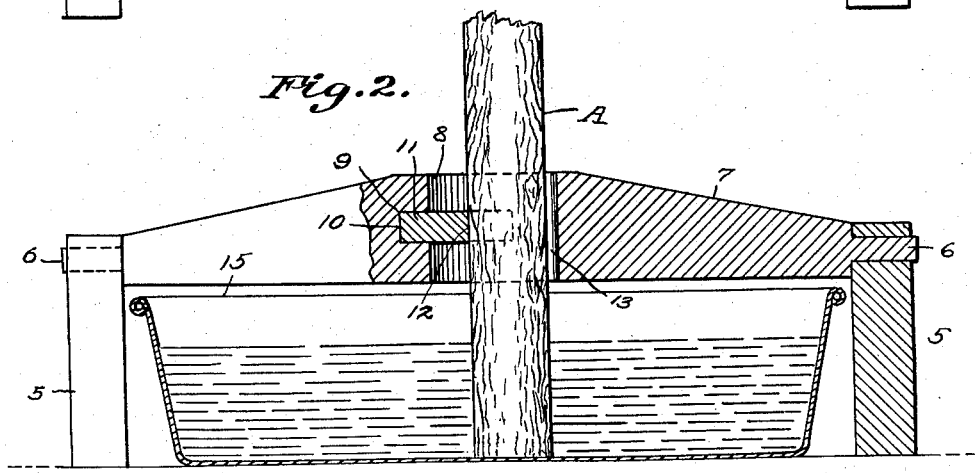
Delmer C. Fox
INVENTOR
BY C. A. Snow & Co.
ATTORNEYS.

United States Patent Office 2,879,019
Patented Mar. 24, 1959

2,879,019

CHRISTMAS TREE STAND

Delmer C. Fox, Darby, Mont.

Application May 17, 1956, Serial No. 585,465

1 Claim. (Cl. 248—44)

This invention relates to Christmas tree stands, the primary object of the invention being to provide a Christmas tree stand which will support a tree in an upright position, eliminating the necessity of using nails, screws or similar securing means which damage and disfigure floors or supporting surfaces on which the tree is placed.

An important object of the invention is to provide novel means for securing the tree within the stand, the securing means being such that tree trunk bases of various diameters may be secured within the stand without the necessity of altering the structure of the securing means in any way.

A further important object of the invention is to provide a tree stand which will be light in weight, due consideration having been given to the strength and durability of the holder.

Other and further objects and advantages of the invention will be hereinafter described and the novel features thereof defined in the appended claims.

Referring to the drawing:

Fig. 1 is a plan view of a Christmas tree stand constructed in accordance with the invention, the tree trunk being shown in section.

Fig. 2 is a partial sectional view taken through one of the side bars of the frame and the connecting bar between the side bars of the frame.

Referring to the drawing in detail, the stand comprises a pair of parallel spaced horizontal bars indicated by the reference character 5, which bars are provided with openings through which the ends 6 of the connecting bar 7 extend, the connecting bar being such as to set up a binding action between the spaced horizontal bars 5 and connecting bar to provide a rigid structure.

As better shown by Fig. 2 of the drawing, the connecting bar 7 has its upper surface beveled from a point adjacent to the center thereof to add strength to the bar to support the weight of the Christmas tree positioned within the holder.

The connecting bar 7 is formed with a circular opening 8 that is disposed intermediate the ends thereof, the circular opening being disposed vertically.

One wall of the opening 8 is provided with a horizontally formed groove 9 presenting a straight edge, to receive the straight edge 10 of the wedge 11 thus presenting the inclined edge 12 of the wedge 11 to the edge of a tree trunk positioned within the opening 8 so that by forcing the wedge 11 in one direction, the wedge will set up a binding action between the wall of the circular opening 8 and tree trunk which in the present showing is indicated by the reference character A, to securely hold the tree trunk in a vertical position.

Because the connecting bar 7 is substantially thick at its central portion, and since the wedge 11 is comparatively thin, it will be seen that a three point suspension is provided between the wedge and wall of the opening 8.

As better shown by Fig. 1 of the drawing, the opening 8 is provided with an offset portion 13 which presents shoulders 14 that bite into the trunk of the tree held within the opening to hold the tree against tilting or moving within the opening.

It will also be noted that the bar 7 is so spaced from the lower edges of the bars 5 that a clearance is provided between the lower surface of the bar 7 and the floor surface, to accommodate a pan such as indicated by the reference character 15, the pan being designed to contain water to supply moisture to the tree and preserve the life of the tree.

From the foregoing it will be seen that I have provided a Christmas tree support or stand which is exceptionally cheap to manufacture, and one which will support the average size Christmas tree in a true upright manner.

Having thus described the invention what is claimed is:

In a tree stand, a body comprising a frame including spaced parallel side bars, a horizontal bar connected between said side bars at points intermediate the ends of said side bars and adjacent to the upper edges of said side bars, said horizontal bar having a vertically disposed circular opening in which the base end of a tree trunk is adapted to be positioned, said opening having a reduced offset curved portion in the wall thereof presenting shoulders, said shoulders forming sharp edges at their juncture with said opening, one wall of said opening having a horizontal transversely disposed slot communicating with said opening, the ends of the transversely disposed slot in the form of a truncated triangle terminating at the side faces of said horizontal bar, a wedge block having a straight edge fitted within said groove and having a beveled edge extending into said opening, and said beveled edge of said wedge block adapted to engage a tree trunk held within said opening to clamp the tree trunk between said wedge block and the wall of said opening against said shoulders.

References Cited in the file of this patent

UNITED STATES PATENTS

| | | |
|---|---|---|
| 535,887 | Brown | Mar. 19, 1895 |
| 680,775 | Holst | Aug. 20, 1901 |
| 1,997,870 | Merrill | Apr. 16, 1935 |

FOREIGN PATENTS

| | | |
|---|---|---|
| 236,066 | Great Britain | July 2, 1925 |
| 283,903 | Germany | Apr. 28, 1915 |